No. 718,336. PATENTED JAN. 13, 1903.
S. FREUND.
NUT LOCK.
APPLICATION FILED JUNE 23, 1902.
NO MODEL.

Witnesses:
Chas. E. Gaylord,
John Enders Jr.

Inventor:
Siegfried Freund,
By Dyrenforth, Dyrenforth & Lee,
Attys.

UNITED STATES PATENT OFFICE.

SIEGFRIED FREUND, OF CHICAGO, ILLINOIS.

NUT-LOCK.

SPECIFICATION forming part of Letters Patent No. 718,336, dated January 13, 1903.

Application filed June 23, 1902. Serial No. 112,905. (No model.)

*To all whom it may concern:*

Be it known that I, SIEGFRIED FREUND, a subject of the Emperor of Austria-Hungary, residing at Chicago, in the county of Cook and State of Illinois, have invented a new and useful Improvement in Nut-Locks, of which the following is a specification.

My invention relates to an improvement in the class of nut-locks in which the locking effect is produced by a washer slidingly engaging with a slot in the bolt to prevent rotation of the washer and also engaging with teeth on the face of the nut to prevent its backward rotation.

The object of my invention is to provide an improved construction as to details of the variety of nut-lock referred to, particularly with a view to shielding the mutually-engaging parts of the washer and nut against the injurious effects of moisture and against accidental impairment, as by fracture.

Figure 1:
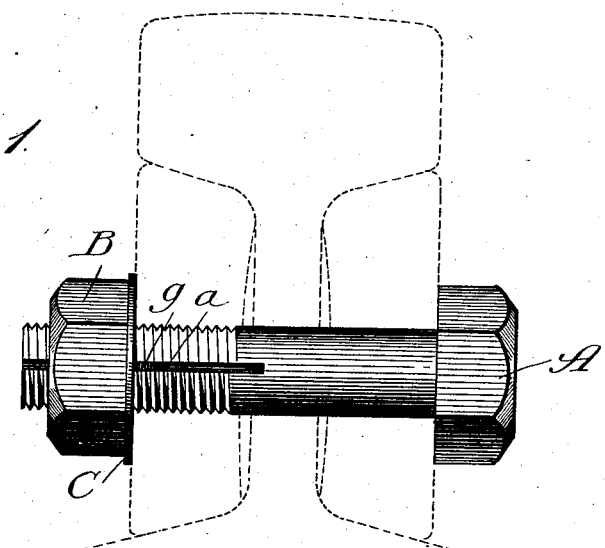
Figure 3:
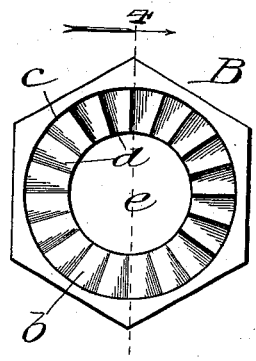
Figure 2:
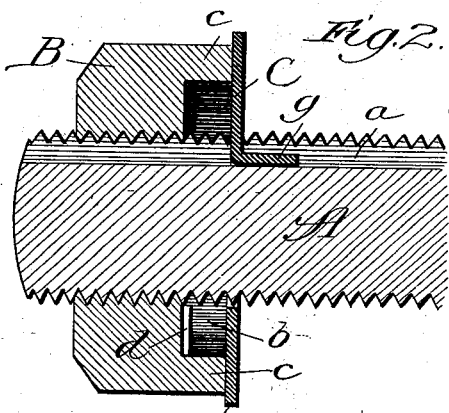
Figure 4:
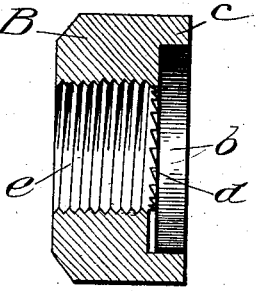
Figure 5:
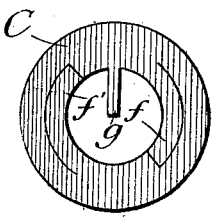
Figure 6:
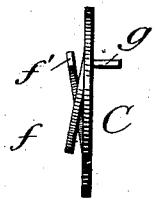
Figure 7:
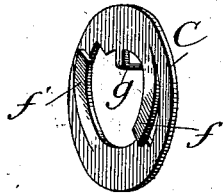
Figure 8:
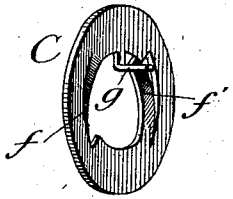

Referring to the accompanying drawings, Figure 1 shows by a view in elevation my improved nut-lock operatively applied in fastening fish-plates to the sides of a railway-rail, as illustrated by a dotted representation. Fig. 2 is an enlarged broken longitudinal section of the threaded end of the bolt with the nut and washer thereon forming my improved nut-lock. Fig. 3 is a face view of the nut. Fig. 4 is a section taken at the line 4 on Fig. 3 and viewed in the direction of the arrow. Fig. 5 is a face view of the nut-locking washer. Fig. 6 is a view of the washer in edge elevation. Fig. 7 is a perspective view of the washer showing one side thereof, and Fig. 8 is a similar view of the same showing the opposite side.

A is the bolt, containing in one side a longitudinal slot $a$, which extends through the threaded section.

B is the nut, having its face depressed to form therein a housing $b$, surrounded by a flange $c$, and the base of which is provided with ratchet-teeth $d$ about the threaded nut-orifice $e$.

C is the annular washer, formed of thin springy steel, having stamped out of the wall about its opening an arc-shaped tongue, and preferably, as shown, two such tongues $f$ and $f'$, the extremities of which are bent to project beyond the face of the washer, which is designed to engage with the nut. A guide-finger $g$ is stamped out of the material of the washer about its opening between adjacent ends of the tongues $f f'$ and is projected for some length at a right angle from the face of the washer opposite that from which the tongues project to enter the slot $a$ and afford therein an elongated guide having a comparatively long extent of surface bearing against the opposite walls of the slot to facilitate its guiding and antibinding function in the movement of the washer.

In the use of my improved device the finger $g$, by its confinement in the bolt-slot $a$, locks the washer against rotating on the bolt, and one face of the washer bears against the nut-flange $c$, with the tongues $f f'$ entering the housing $b$ and engaging with the teeth $d$ on its base to lock the nut against backward rotation. By thus providing the housing $b$ in the face of the nut the teeth thereon, as well as the tongues on the washer, are shielded against the access of moisture and other exposure and are thus protected from harm, thereby materially increasing the durability of the nut-lock.

What I claim as new, and desire to secure by Letters Patent, is—

1. A nut-lock comprising, in combination, a threaded bolt provided with a longitudinal slot, a nut screwing on said bolt and having a depressed face forming a flanged housing, teeth formed on the base of said housing, and a washer having one or more tongues projecting from one side into engagement with said teeth and a guide-finger projecting from its opposite side into said bolt-slot, substantially as described.

2. A nut-lock comprising, in combination, a threaded bolt provided with a longitudinal slot, a nut screwing on said bolt and having a depressed face forming a flanged housing, teeth formed on the base of said housing, and a washer having tongues projecting from one side into engagement with said teeth and a guide-finger elongated to project at a right angle from its opposite side into said bolt-slot and therein form an antibinding guide, substantially as described.

SIEGFRIED FREUND.

In presence of—
ALBERT D. BACCI,
A. C. KITTLESON.